United States Patent [19]
Schuck

[11] Patent Number: 6,158,823
[45] Date of Patent: Dec. 12, 2000

[54] TOWED VEHICLE BRAKE ACTUATION SYSTEM

[76] Inventor: John Robert Schuck, 101 N. Governor St., Evansville, Ind. 47711

[21] Appl. No.: 09/216,419

[22] Filed: Dec. 19, 1998

Related U.S. Application Data

[60] Provisional application No. 60/081,513, Apr. 13, 1998, and provisional application No. 60/087,715, Jun. 2, 1998.

[51] Int. Cl.[7] ................................................ B60T 13/00
[52] U.S. Cl. ................................................ 303/7; 303/12
[58] Field of Search .................... 303/7, 12; 188/3 R, 188/112 R, 112 A

[56] References Cited

U.S. PATENT DOCUMENTS

| | | | |
|---|---|---|---|
| 5,411,321 | 5/1995 | Harness | 303/7 |
| 5,431,253 | 7/1995 | Hargrove | 188/3 H |
| 5,823,637 | 10/1998 | Blue | 303/7 |
| 5,911,483 | 6/1999 | Overhulser | 303/7 |
| 5,915,798 | 6/1999 | Ford | 303/7 |

*Primary Examiner*—Michael Mar
*Assistant Examiner*—Xuan Lan Nguyen
*Attorney, Agent, or Firm*—George H. Morgan; Theresa Camoriano; Mark Manley

[57] ABSTRACT

The present invention is a vacuum operated brake actuation sytem for actuating a towed vehicle's brake system. In a preferred embodiment it comprises a source of vacuum, a vacuum level sensor and switch, an electrically operated, spring return, four way, two position, vacuum valve with speed controls, and a double acting vacuum operated cylinder that actuates the towed vehicle's brake pedal which actuates the towed vehicle's brake system as the cylinder is directed by the valve. The preferred embodiment also comprises electrical wiring, vacuum hoses, fittings, connections, check valves, a breakaway switch, and other miscellaneous bracketry and hardware as required to complete the system. A vacuum pump along with a vacuum level sensor and switch for monitoring vacuum levels and passing electrical power to operate the vacuum pump as required are included in the preferred embodiment of the present invention.

7 Claims, 4 Drawing Sheets

TOWED VEHICLE BRAKE ACTUATION SYSTEM

This applicationclaim benefit to provisional appllication No. 60/081,513 filed Apr. 13, 1998 provisional application No. 60/087,715 filed Jun. 2, 1998.

CROSS REFERENCES TO RELATED APPLICATIONS

None

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a means of actuating a brake system in a towed vehicle such as, but not restricted to, an automobile or truck, by means of utilizing the existing brake system of the towed vehicle in conjunction with a towing vehicle's brake system. The invention not only permits service brake actuation of the towed vehicle while it is towed, but also provides for emergency actuation of the vehicle brakes in the event said towed vehicle breaks loose from being towed.

2. Background Information

In some states within the United States and at least one province in Canada require that an automobile, when towed, must have its brake system actuated as the towing vehicle brakes are actuated. Also, if the automobile being towed breaks loose from the towing vehicle, the brakes automatically actuate. There are limitations to braking systems currently used.

There is a BRAKEMASTER (TM) proportionate braking system by Roadmaster, Inc., a firm located at 5602 N.E. Skyport Way, Portland, Oreg. 907218 which consists of an air cylinder rigged up to actuate a towed vehicle's brake pedal. This brake system is in use in conjunction with motor homes towing vehicles, especially light cars. The air cylinder is actuated from air tapped off the air or air over hydraulic brake system of the motor homes that have air or air over hydraulic brake systems. For motor homes that do not have an air system, a compressor is required to be added. A problem with an air system is moisture in the air, especially in wintertime. A problem with an air cylinder actuating a towed vehicle's brake pedal is that, while a vehicle is being towed, the vehicle's vacuum power boost system is off. This means excessive brake pedal force is required to compensate for the lack of vacuum boost that would be available if the towed vehicle was being driven instead of towed. This excessive brake pedal force, as it is repeated enough times, wears out the mechanical linkages, connections, and structure of the brake pedal and the surrounding structure of the vehicle to which the brake pedal is mounted. Typically, this is that surrounding structure is the firewall of the vehicle, which wasn't designed to withstand repetitive excessive force applications on the brake pedal attached to the firewall.

On all hydraulic brake systems, tapping into the towed vehicle's brake system could void the brake warranty of the towed vehicle.

There is a TOAD STOP (TM) VAC-BRAKE (TM) which uses vacuum from an engine of a towing vehicle in conjunction with a double acting vacuum cylinder with two three-way electric solenoid operated vacuum valves to pull on a brake cable which pulls on an attachment to the towed vehicle's brake pedal as the towing vehicle brake pedal is actuated. As vacuum is not available from a diesel engine, the applicability of this system is restricted to towing vehicles with gasoline powered engines. Also there are problems resulting from cable stretch, cable fraying, and fitting connections to the cable. Also, in this system, the vacuum is used to retract the vacuum cylinder's piston to pull on the brake cable. Retracting a vacuum cylinder's piston to exert force, or move a load, is less efficient than extending a vacuum cylinder's piston to exert a force, or move a load. For example, a one and a half inch diameter vacuum cylinder, with a single one half inch rod, which is a typical cylinder for such an application, is 11% less efficient in retracting a load, as opposed to being used to extend a load. In the event of a towed vehicle breaking loose from a towing vehicle, the system actuates automatically. A limitation to this approach is that for many smaller cars, there is insufficient space under the hood of the car for the vacuum cylinder. Also, the brake cable comes through the firewall of the towed vehicle to a bracket attached to the towed vehicle's brake pedal. When a person wants to drive said towed vehicle, there is a problem of what to do with the pedal bracket and cable. A loose cable end and the bracket on the floor of the vehicle is apt to get in the way of a driver's foot while the driver is trying to actuate a pedal. Also, to ensure sufficient vacuum for stopping the towed vehicle in the event of a breakaway condition, an optional vacuum reservoir is available that usually will not fit in the engine compartment of small cars, such as a SATURN (TM). The TOAD STOP (TM) VAC-BRAKE (TM) uses vacuum derived from a towing vehicle engine creating the possibility of contamination entering the towing vehicle engine which could cause engine wear and failure.

Both of the above systems rely on hoses from the towing vehicle to the towed vehicle which involves a hose the length of the towing vehicle as well as two quick disconnects in the hoses between the vehicles. The hose between the two vehicles runs a risk of hose damage from road hazards. Three quick disconnects are required. For vacuum systems, dirt can enter the equipment on the towing vehicle. For hydraulic hoses, leakage which means a loss of fluid can result. For air systems, air pressure can be lost, which can cause a serious problem with the towing vehicle brake system.

Existing systems tend to use a three way air or vacuum valve for cylinder rod actuation in a given direction and rely on brake system return springs for return of the pedal with attachments. This can cause brake drag in some circumstances. As will be seen from the subsequent description of the preferred embodiment of the present invention, the present invention overcomes these and other shortcomings of the prior art.

SUMMARY OF THE INVENTION

The present invention is a vacuum operated brake actuation system for actuating a towed vehicle's brake system. Its preferred embodiment comprises a source of vacuum, an electrically operated, spring return, four way, two position vacuum valve with flow controls, and a double acting vacuum operated cylinder that actuates the towed vehicle's brake pedal which actuates the towed vehicle's brake system as directed by said valve. It also comprises electrical wiring, vacuum hoses, fittings, connections, check valves, a breakaway switch, a cable from the towing vehicle to the brake-away switch, and other miscellaneous bracketry as required to complete the system. In the preferred embodiment of the present invention, a vacuum pump along with a vacuum level sensor and switch for monitoring vacuum levels and passing electrical power to operate the vacuum pump is installed in the towed vehicle as a source of vacuum. A less desirable approach would be using the towing vehicle as the source of vacuum.

DESCRIPTION OF THE PREFERRED EMBODIMENTS

Figure 1:
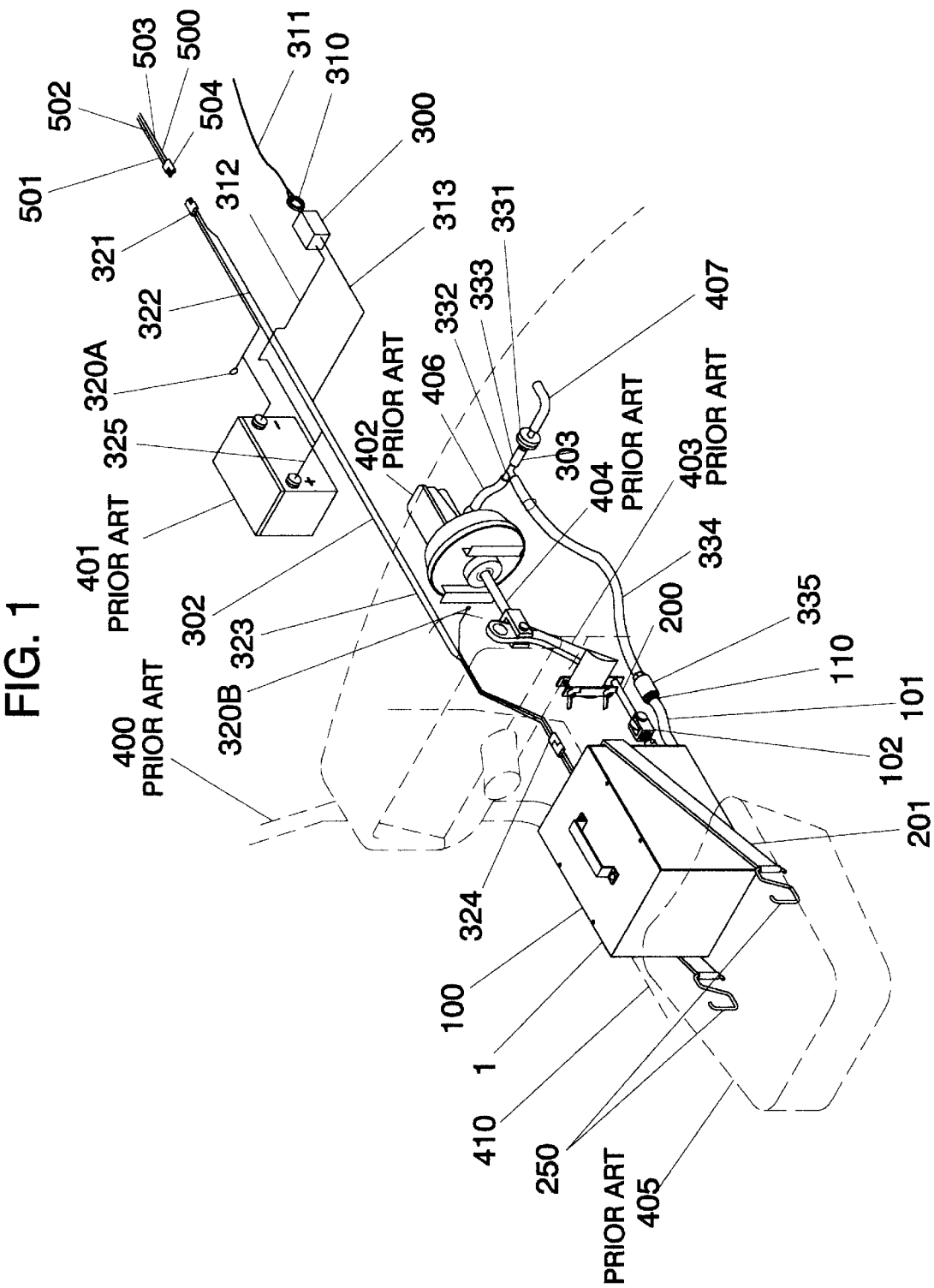
FIG. 1 illustrates the preferred embodiment of the present invention, a towed vehicle brake actuation system, installed in a towed vehicle.

FIG. 1 shows the preferred embodiment of the present invention, a towed vehicle brake actuation system 1 comprising a vacuum assist unit 100, a means of securing the vacuum assist unit 100 in position, a breakaway sensing switch 300, and various hoses, fittings, and electrical hardware items as required to interface the system with a towed vehicle 400 as will be detailed in this description. In the preferred embodiment of the present invention, the means of securing the vacuum assist unit 100 in position, on a floor 410 of the towed vehicle 400 comprises a retaining strap 201 with hooks 250, said hooks attached as convenient to vehicle bracing or structural elements as are found under a vehicle seat 405 with the retaining strap 201 holding the unit 100 against the seat 405 as the unit 100 sits on the floor of the towed vehicle 400. Such a vehicle seat 405 typically has exposed springs underneath said seat as well as structural members suitable for attaching hooks 250.

Figure 2:
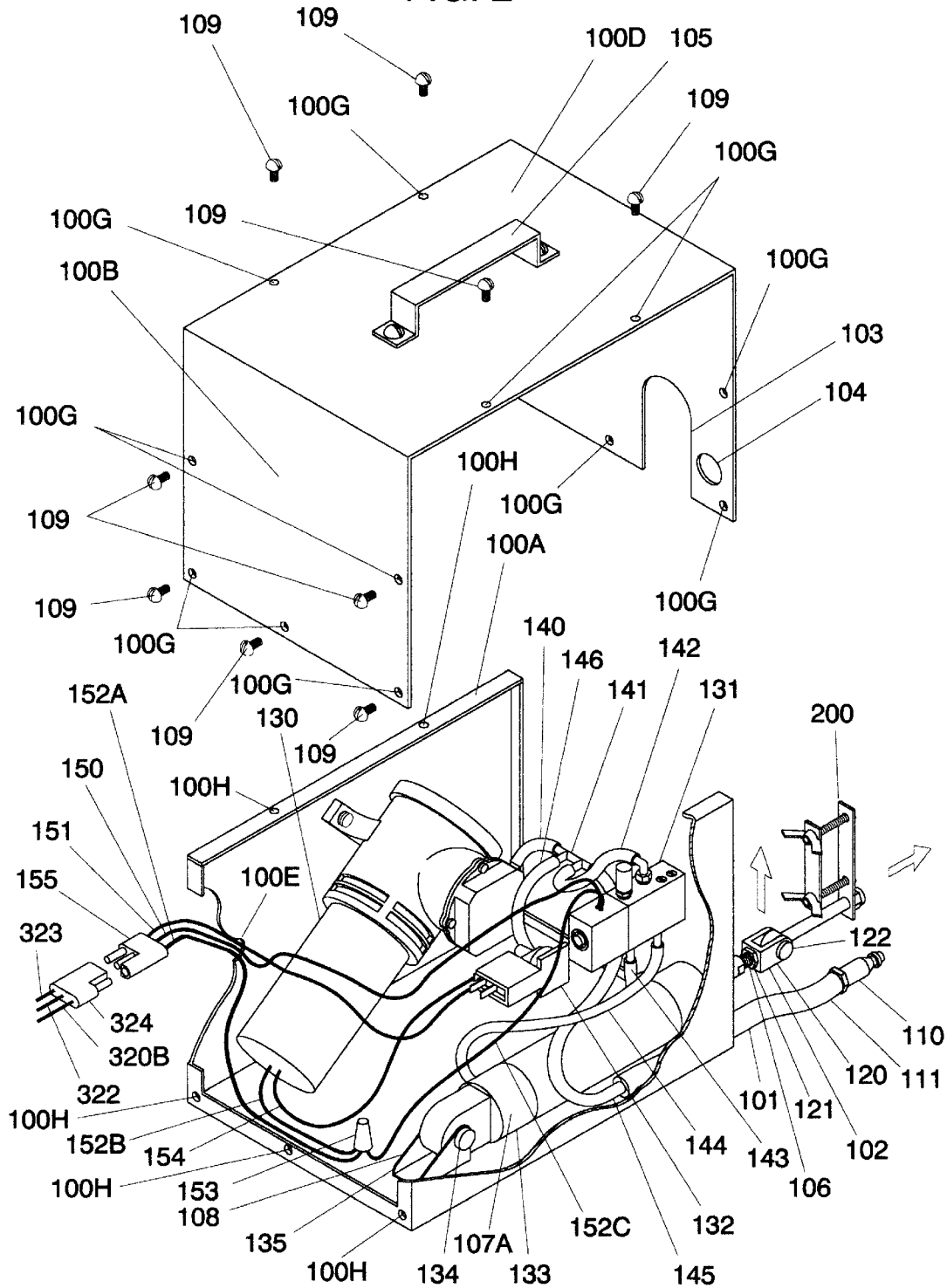
FIG. 2 illustrates details of a vacuum assist unit.

As shown in FIG. 2, the vacuum assist unit 100 comprises an upper case 100B, a lower case 100A, screws 109 which secure the upper case 100B to the lower case 100A through screw clearances 100G into threaded apertures 100H, a vacuum pump 130 which is attached to the lower case 100A, a vacuum actuateable, double acting cylinder 133, an electrically operated four way vacuum valve 131, a brake pedal clamp assembly 200, a vacuum level sensor and switch 132, and electrical hardware, hoses, and hose fittings as will be described. The double acting cylinder 133 further comprises a threaded cylinder rod 106 which is extendable from and retractable into the double acting cylinder The upper case 100B comprises a cover 100D, the screw clearances 100G, a handle 105 attached to the upper case 100B, a cylinder clearance 103 through which the cylinder rod 106 extends, and an aperture 104 through which a vacuum supply line 101 extends. The handle 105 is a convenience for carrying and installation of the vacuum assist unit 100.

Electrical power and control is supplied to the towed vehicle brake actuation system 1 from a towing vehicle by means of a towing vehicle wiring harness 500 (Ref. FIG. 1) comprising a towing vehicle ground connection 501, a towing vehicle direct current supply 502, and a towing vehicle actuatiny input line 503 which is connected to a towing vehicle brake light switch, and a towing vehicle connector half 504. A towed vehicle chasis wiring cable 302 comprises a chassis cable connector half 321, ground wires 320A and 320B, a towed vehicle positive supply line 323, and an actuating input line 322. To connect the towed vehicle brake actuating system 1 to the towing vehicle wiring harness 500, the towing vehicle connector half 504 is connected to the chassis cable connector half 321 of the vehicle chassis wiring cable 302, said connector half 504 being compatible with and connectable to said connector half 321.

When the connector halves 504 and 321 are connected, electrical power flows from the towing vehicle direct current supply 502 to the positive supply line 323; the towing vehicle actuating input line 503 is connected to the actuating input line 322; and the towing vehicle ground connection 501 is connected to the ground wire 320A of the towed vehicle 400.

There is a vacuum assist unit connector half 155. When it is connected to a chassis cable connector 324, the positive supply line 323 is connected to an electrical line 151 which is connected to the vacuum level and sensor switch 132; the actuating input line 322 is connected to a valve actuating input line 150 which is connected to the vacuum valve 131; and the 320B ground wire is connected to a ground connection 152A which is connected to ground connections 152B and 152C, as shown in FIG. 2.

The vacuum pump 130 is grounded by the ground wire 152B. The vacuum level sensor and switch 132 is grounded by the ground wire 152C. The ground wires 152B and 152C connect to the ground wire 152A which is connected to the chassis ground 320B through the connector halves 155 and 324. The wire aperture 101E in the lower case 100A serves as an entry for the ground wire 152A, along with the electrical line 151 and the valve actuating input line 150.

There is a breakaway cable 311 which is connected to the towing vehicle and to the breakaway sensing switch 300 which is a normally open (i.e. not passing) switch. If the towed vehicle 400 breaks loose from the towing vehicle, the breakaway cable 311 will actuate a breakaway switch actuator 310, which closes the switch 300 (i.e. the switch 300 will pass electrical current). Then the towed vehicle battery 401, which is connected to the switch 300 by a breakaway switch supply line 312, will energize the breakaway switch operating line 313 which energizes in turn the actuating input line 322 which activates through a chassis cable connector half 324 and the vacuum unit electrical connector half 155 through the valve actuating input line 150 to shift the electrically operated four way vacuum valve 131 which will then permit a vacuum to be drawn on the cylinder 133 which will extend the cylinder rod 106, through the cylinder clearance i03 of the cover 100D, which will activate the towed vehicle's brake pedal 403 by means of the bracket assembly 200 which connects the cylinder rod 106 (that is a part of and can be extended from or retracted into the cylinder 133) to the brake pedal 403. The brake pedal 403 is connected to prior art brake pedal linkage 404 which actuates the towed vehicle prior art master cylinder and vacuum power brake booster assembly 402 which actuates the rest of the towed vehicle's prior art brake system in the event the towed vehicle breaks away.

Figure 3:
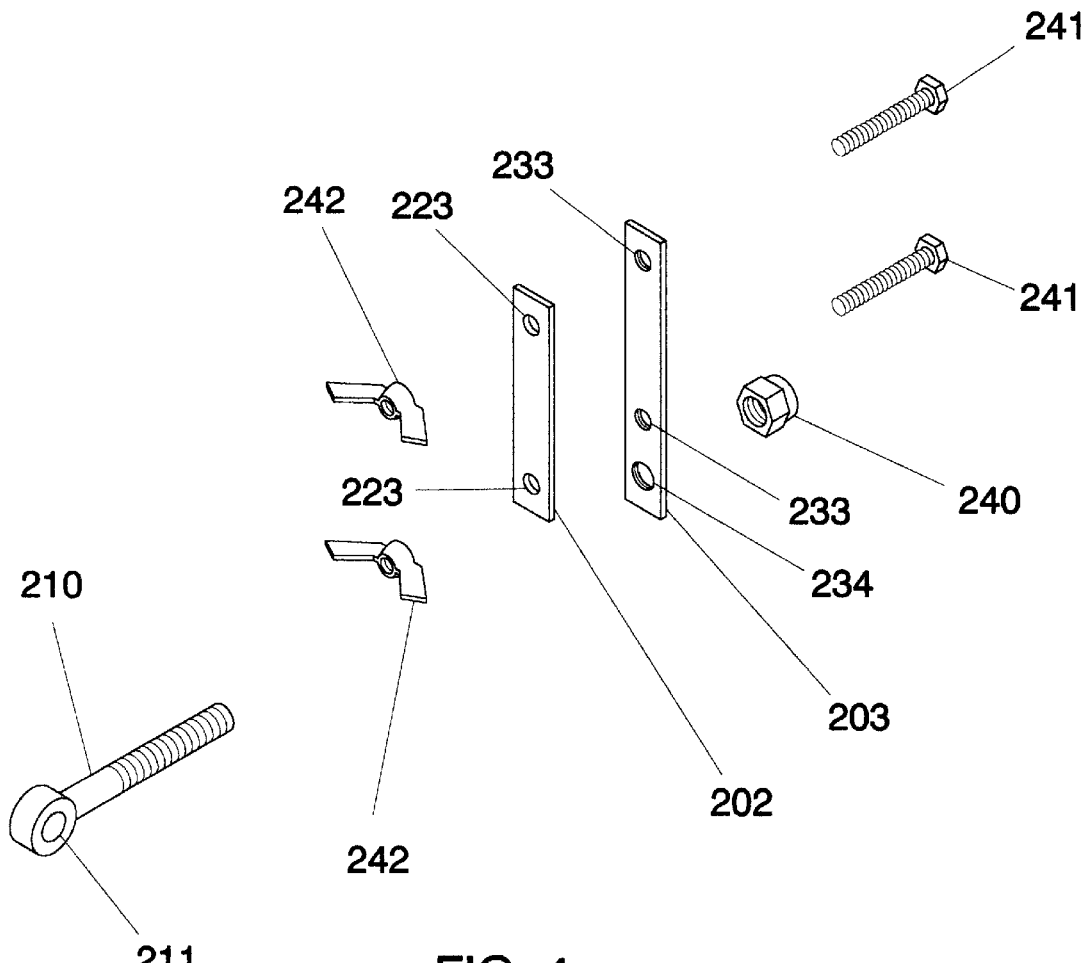
FIG. 3 illustrates details of a towed vehicle brake pedal bracket.

In normal operation, when a brake pedal in the towing vehicle is actuated, an input signal is sent through the towing vehicle actuating input line 503, through the vehicle connector half 504, through the towed vehicle chassis cable connector half 321, through the actuating input line 322, through the chassis cable connector half 324, through the main unit electrical connector half 155, through the actuating input line 150, which actuates the valve 131 which results in a vacuum in the rod 106 end of the cylinder 133 from a cylinder extension vacuum line 143, which is connected from the valve 131 to the cylinder 133. The vacuum pump is in fluid communication with the valve 131 and the cylinder 133 by means of the vacuum line 143 and other lines to be discussed. The cylinder 133 has a pivot mount 135 which permits the cylinder 133 to pivot about a cylinder mount pin 134. The pivot mount 135 is attached to a bracket 108 which is attached to the lower case 100A. The cylinder rod 106 has connected to it a clevis assembly 120 which is attached to the brake pedal clamp assembly 200 by means of a connecting pin 122 through the clevis 102 and a clevis mount pin clearance 211 of a clamp mount threaded rod 210 (Ref. FIG. 3). The cylinder 133 and the cylinder rod 106 have freedom of movement, by virtue of the mounting arrangements with the pivot mount 135 and the clevis assembly 120 as shown by arrows in FIG. 2. There is a length adjustment lock nut 121 which is used to lock the clevis assembly 120 in position on the threaded cylinder rod 106. The clevis assembly 120 is a typical cylinder rod clevis, with threads to match the cylinder rod 106 as is common to the trade.

In the preferred embodiment of the present invention, the valve 131 is an electrically operated, spring return, four way, two position, vacuum valve with adjustable flow controls for regulating the speed of actuation of the cylinder 133. Vacuum valves, in general, are similar to pneumatic valves, except, perhaps, sealing modifications internally. When discussing vacuum operation of the cylinder 133, what is meant is that a vacuum is induced so that atmospheric pressure can actuate the cylinder 133, extending or retracting the cylinder rod 106 as directed by the valve 131. When there is no electrical input to the valve 131, said spring return in the valve 131 resets the valve 131 so a vaccum is drawn in the cylinder 133 at a distal end 107A of the cylinder 133, so that atmospheric pressure retracts the cylinder rod 106 within the cylinder 133 which results in the brake pedal being returned to a non-brake actuating position.

The brake pedal clamp assembly 200 comprises (Ref. FIG. 3) the clamp mount threaded rod 210 with the clevis mount pin clearance 211, clams quick release wing nuts 242, a clamp jaw 202, a clamp base 203, a clamp mount nut 240, and clamp bolts 241. The clamp jaw 202 has bolt clearances 223. The clamp base 203 has threaded apertures 233 to receive the clamp bolt 241, and a mount rod threaded aperture 234. To assemble the brake pedal clamp assembly 200, as shown in FIG. 1 and 2, the clamp bolts 241 are threaded through the threaded apertures 233 of the clamp base 203. The clamp mount threaded rod 210 is threaded into the mount rod threaded aperture 234 of the clamp base 203 and locked in position with the clamp mount nut 240. The clamp base 203 is placed behind the brake pedal 403 and the clamp jaw 202 is placed over the clamp bolts 241, against the brake pedal 403. The bolt clearances 223 of the clamp jaw 202 are spaced so they match the spacing of the clamp bolts 241 in the clamp base 203. The clamp jaw 202 is secured against the brake pedal 403 by means of the wing nuts 242.

Figure 4:
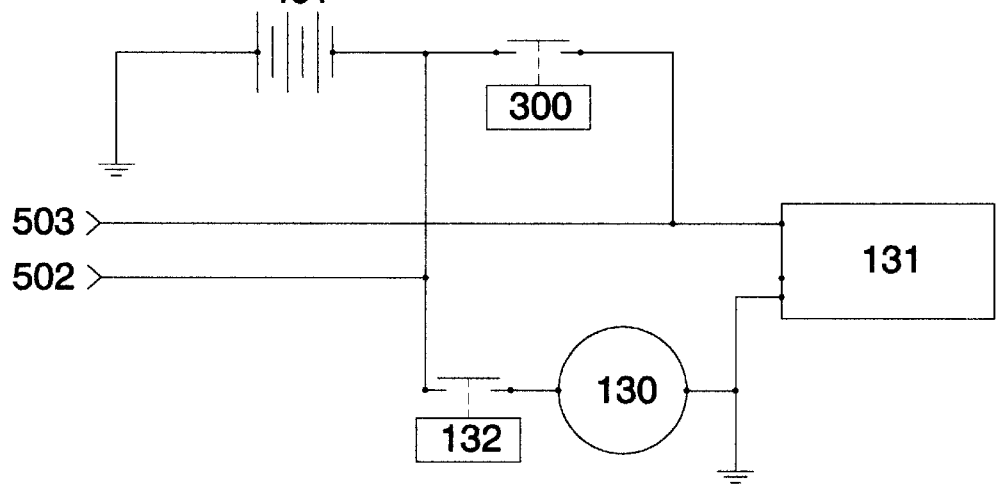
FIG. 4 is an electric schematic of the towed vehicle brake actuation system.
Figure 5:
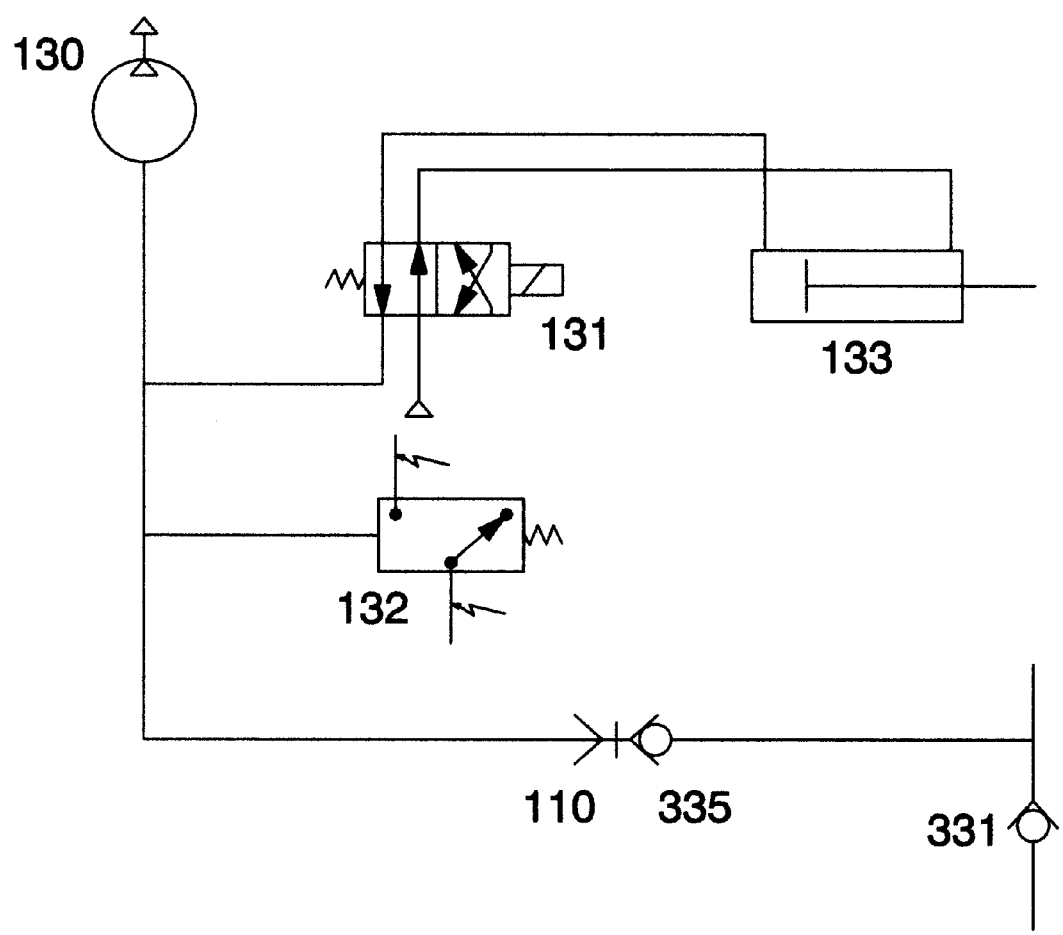
FIG. 5 is a pneumatic schematic of the towed vehicle brake actuation system.

FIG. 5 is a pneumatic schematic of elements of the towed vehicle brake actuation system 1. FIG. 4 is an electrical schematic of elements of the towed vehicle brake actuation system 1. These were included to assist in understanding said system 1 operation.

A purpose of the vacuum level sensor and switch 132 is to sense when the vacuum in towed vehicle brake actuation system 1 falls outside a desired range. A typical desired range would be from seventeen to twenty inches of mercury of vacuum. When the vacuum falls below the desired range, the sensor and switch 132 activates, permitting electrical power to be transmitted from the electrical line 151 through the sensor and switch 132 to a pump activating line 154, which connects from the sensor and switch 132 to the vacuum pump 130. The vacuum pump 130 is a typical electrically powered vacuum pump known in the trade and available from such manufacturers as Gast Mfg. in Benton Harbor, Mich. The vacuum pump 130, when turned on by electricity passing through the sensor and switch 132, then pumps until the vacuum is sufficiently above the minimum vacuum level setting of sensor and switch 132 for the sensor and switch 132 to reset so the power is shut off to the vacuum pump 130. In a lessor preferred embodiment of the present invention, a vacuum line could be run from a towing vehicle to a reservoir connected to the valve 131. However, an advantage of using the vacuum pump 130 with the valve 131 is that a vacuum line with quick disconnects between the vehicles is avoided.

The vacuum pump 130 draws a vacuum through the main vacuum source line 140 which is connected both to the vacuum pump 130 and a fitting 141. To the fitting 141 is connected a sensor vacuum line 146 which is also connected to the sensor and switch 132. To the fitting 141 is also connected a valve supply line 142 which is also connected to the valve 131. From the valve 131 are connected a cylinder extension line 143 and a cylinder retraction line 144, which are also connected to the cylinder 133. To the fitting 141 is also connected a routing connector line 145 which is a part of a towed vehicle chasis vacuum supply line 101, said vacuum supply line 101 extending through the aperture 104 of the upper case 100B. Said vacuum supply line 101 includes a fitting 110 which connects to a female quick connector coupler 335 on a main chassis vacuum supply line 334 which connects to a T fitting 332 installed in a chassis vacuum supply 303. The chassis vacuum supply 303 includes a brake booster line 406 connected to the existing towed vehicle prior art brake booster and master cylinder assembly 402, a check valve line 333 which is connected to a check valve 331 which is connected to a supply line 407 from an engine manifold. The purpose of the check valve 331 is to prevent air (from the supply line 407 from an engine manifold when the towed vehicle's engine is not operating) invading the towed vehicle brake actuation system 1 and hindering the ability of the system 1 to maintain an adequate amount of vacuum in the brake booster 402. As can be seen from the above description, the vacuum pump 130 is in fluid communication with the brake booster 402 so the vacuum level in the brake booster 402 is maintainable by the vacuum pump 130. Also, the brake booster 402 in combination with the various vacuum lines act as a vacuum reservoir for the towed vehicle brake actuation system 1.

An advantage of the present invention is that the vacuum assist unit 100 is removable from vehicle 400 by detaching the brake pedal clamp assembly 200 from the brake pedal 403, unhooking the hooks 250 from under the seat 405, uncoupling the male quick connect fitting 110 from the female quick coupler 335, and uncoupling the electrical coupler halves 155 and 324.

People in motor homes often tow a small car to their camping location, then drive the small car for convenience. When moving the motor home off to the next destination, the small vehicle is again towed. The present invention is easy enough to hook up and remove that is would be convenient for such uses.

Another advantage of the preferred embodiment of the present invention is that a supplementary vacuum reservoir is avoided for most vehicles.

A cylinder pulling with its rod has a less effective piston area than a cylinder that is pushing with its rod.

Another specific advantage of the present invention is that it works with small vehicles that do not have room for an actuating cylinder or a vacuum reservoir in an engine compartment.

Although the description above contains many specificities, these should not be construed as limiting the scope of the invention but as merely providing illustrations of some of the presently preferred embodiments of this invention.

For example, in the preferred embodiment of the invention, a double acting vacuum cylinder with 12 volt electrical solonoid operated, spring return, four-way, vacuum valve is specified. This is advantagous over using a double acting cylinder in conjunction with two three way electrical solonoid operated valves in that fewer connections are required. This is highly desirable in braking systems. However, although probably less reliable, the present invention could be made to work with a double acting cylinder and two three way electric solonoid valves.

Thus the scope of the invention should be determined by the appended claims in the formal application and their legal equivalents, rather than by the examples given.

For the purpose of promoting and understanding of the principles of the invention, references were made to the embodiment illustrated in the drawing and specific language was used to describe the same. It should be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

I claim:

1. Towed vehicle brake actuation system for a vehicle being towed by a motor home, said towed vehicle brake actuation system comprising:
   a) a vacuum level sensor and switch,
   b) a vacuum pump which is electrically controlled by said vacuum level sensor and switch,
   c) a cylinder with a rod that can be extended or retracted by atmospheric pressure when a vacuum is induced into said cylinder, said rod being connectable to a brake pedal of a towed vehicle so said rod can exert force to actuate or retract said brake pedal, and
   d) an electrically operated vacuum valve that, when connected to said cylinder, can induce a vacuum within said cylinder as required to permit atmospheric pressure to extend or retract said rod of said cylinder,
   wherein said vacuum pump is in fluid communications with said valve and said cylinder and with a brake booster of the towed vehicle, and
   wherein said vacuum level sensor and switch, said vacuum pump, said cylinder, and said electrically operated vacuum valve are installed in said vehicle being towed by said motor home.

2. The towed vehicle brake actuation system of claim 1 wherein the cylinder is positioned to actuate the brake pedal of the towed vehicle by extension of the rod of the cylinder and said cylinder rod is connected to said brake pedal by a bracket.

3. The towed vehicle brake actuation system of claim 2 wherein the vacuum cylinder is secured to and pivotable about a braket in a vacuum assist unit, said vacuum assist unit seated on a floor of the towed vehicle, and secured in position.

4. The towed vehicle brake actuation system of claim 1 wherein the valve is an electrically operated, spring return, four way, two position vacuum valve.

5. The towed vehicle brake actuation system of claim 4 further comprising a breakaway switch that, when activated by a cable pull resulting from a separation of a towed vehicle by a towing vehicle, electrically energizes the towed vehicle brake actuation system.

6. A brake system for a towed vehicle comprising:
   a) a brake system activated by a brake pedal in a towing vehicle;
   b) means generating an electrical signal responsive to the actuation of the brake pedal in said towing vehicle;
   c) a vacuum cylinder in the towed vehicle;
   d) a vacuum pump maintaining a vacuum in a line in said towed vehicle, said vacuum pump and said line connected to said vacuum cylinder through a valve means; and
   e) a brake actuation means in said towed vehicle including a brake pedal and a brake booster connected to said brake pedal in said towed vehicle, said vacuum cylinder having a rod connected to said pedal in said towed vehicle;
   wherein said valve means is responsive to said electrical signal to supply vacuum from said vacuum pump and line through said valve means to said vacuum cylinder and to said brake booster to actuate the brakes of said towed vehicle.

7. A brake system for a towed vehicle comprising:
   a) a towing vehicle coupled to a towed vehicle;
   b) a vacuum cylinder in the towed vehicle;
   c) a vacuum pump maintaining a vacuum in a line in said towed vehicle, said vacuum pump and said line connected to said vacuum cylinder through a valve means; and
   d) a brake actuation means in said towed vehicle including
      a brake pedal and a brake booster,
      said vacuum cylinder having a rod connected to said brake pedal, and
      a switch responsive to decoupling of the towed vehicle from the towing vehicle to actuate said valve means to connect said vacuum pump and line to said vacuum cylinder to activate the brakes in said towed vehicle.

* * * * *